United States Patent [19]
Chiba

[11] Patent Number: 5,675,709
[45] Date of Patent: Oct. 7, 1997

[54] SYSTEM FOR EFFICIENTLY PROCESSING DIGITAL SOUND DATA IN ACCORDANCE WITH INDEX DATA OF FEATURE QUANTITIES OF THE SOUND DATA

[75] Inventor: Takeshi Chiba, Kanagawa, Japan

[73] Assignee: Fuji Xerox Co., Ltd., Tokyo, Japan

[21] Appl. No.: 731,581

[22] Filed: Oct. 16, 1996

Related U.S. Application Data

[63] Continuation of Ser. No. 180,276, Jan. 12, 1994, abandoned.

[30] Foreign Application Priority Data

Jan. 21, 1993 [JP] Japan ..................... 5-024959
Mar. 17, 1993 [JP] Japan ..................... 5-081146

[51] Int. Cl.$^6$ ..................................................... G10L 3/00
[52] U.S. Cl. .................. 395/2.87; 395/2.22; 395/2.75
[58] Field of Search ........................... 395/2.09, 2.79, 395/2.87, 2.15, 2.2, 2.67, 2.69, 2.76, 2.77, 2.22, 2.75, 2.1, 2.55

[56] References Cited

U.S. PATENT DOCUMENTS

| | | | |
|---|---|---|---|
| 4,627,001 | 12/1986 | Stapleford | 395/2.87 |
| 4,741,038 | 4/1988 | Elko et al. | 381/92 |
| 4,757,540 | 7/1988 | Davis | 395/2.87 |
| 4,779,209 | 10/1988 | Stapleford et al. | 395/2.87 |
| 5,220,611 | 6/1993 | Nakamura et al. | 395/2.87 |

FOREIGN PATENT DOCUMENTS 60-181830  9/1985  Japan ..................... G06F 3/16

OTHER PUBLICATIONS

An overview of the etherphone system and its applications Zellweger et al. IEEE, 1988.

*Primary Examiner*—Allen R. MacDonald
*Assistant Examiner*—Richemond Dorvil
*Attorney, Agent, or Firm*—Finnegan, Henderson, Farabow, Garrett & Dunner, L.L.P.

[57] ABSTRACT

A sound processing system is provided in which a sound signal is stored in a sound data storing unit in the form of digital sound data. The digital sound data is analyzed to obtain a physical feature quantity of the sound signal. Index data indicative of a quantity feature of the sound signal is generated by discriminating a physical feature quantity of the sound signal, and it is stored in an index data storing unit. The digital sound data is processed in accordance with the index data by a data processing unit.

21 Claims, 13 Drawing Sheets

FIG. 4
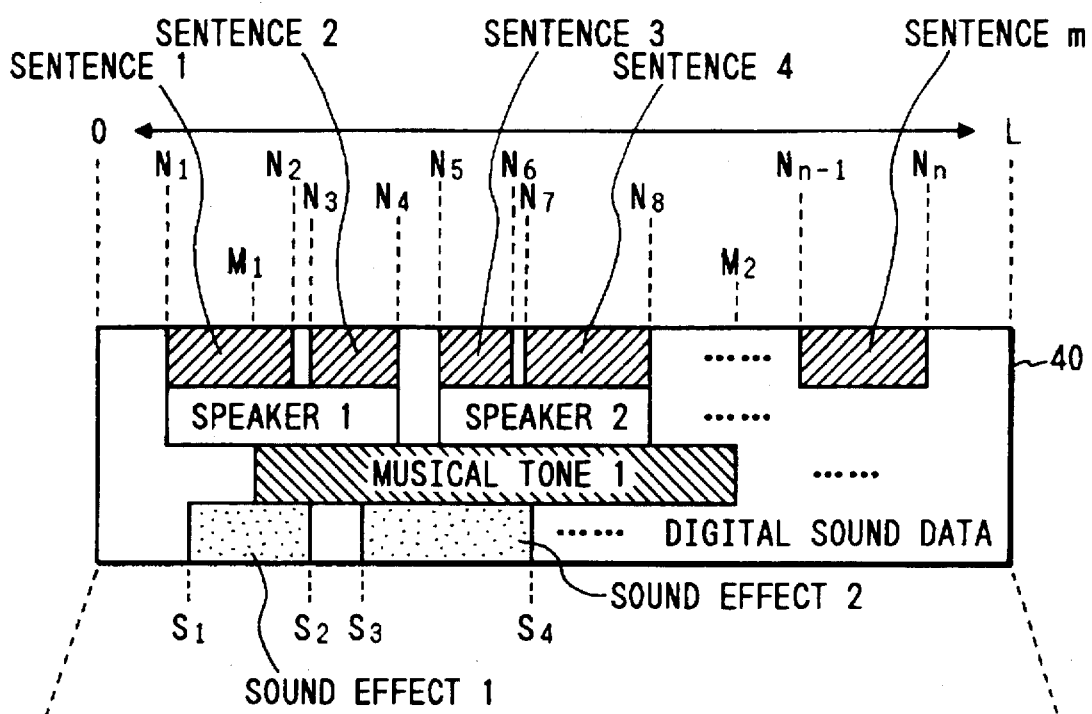
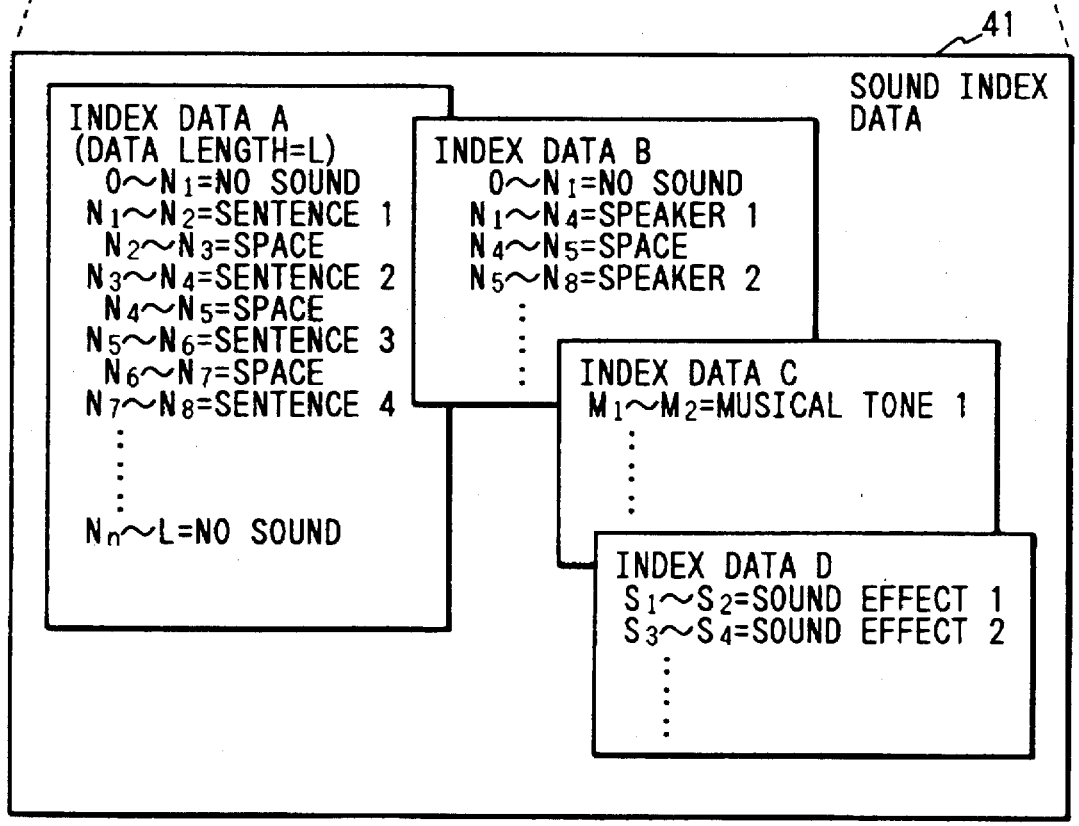

SYSTEM FOR EFFICIENTLY PROCESSING DIGITAL SOUND DATA IN ACCORDANCE WITH INDEX DATA OF FEATURE QUANTITIES OF THE SOUND DATA

This application is a continuation of application Ser. No. 08/180,276, filed Jan. 12, 1994, now abandoned.

BACKGROUND OF THE INVENTION

1. Field of the Invention

The present invention relates to a sound processing system, and more particularly to a sound processing system which can efficiently process digitized sound data signals.

2. Discussion of the Related Art

A variety of techniques electronically processing sound signals have been developed, with the progress of data processors. Japanese Patent Examined Publication No. Sho. 63-30645, entitled "DATA PROCESSING SYSTEM", proposes a data processing system for processing documents including both voice components and text components. The voice components displayed on the screen of the display device indicate the positions of the voice components relative to the text components. Accordingly, the voice components and the text components can be edited by entering edit instructions to the system by pointing out those displayed components with a cursor.

Japanese Patent Unexamined Publication No. Hei. 2-61758, entitled "DOCUMENT EDITING DEVICE", proposes a document editing device capable of handling text data and voice data coexisting in one document data. In this type of the document processor that is capable of handling both the voice signals and the document data, voice insertion signals indicative of the positions of the voice data are inserted in the document data in order to place the voice signals at desired positions of the document data. Further, the voice data is visually coded in order to print out the voice signals. In this case, the visual codes of the voice data are formatted including a synchronizing code indicative of the start of the visual codes.

Japanese Patent Unexamined Publication No. Hei. 3-158900, entitled "RECORD/EDIT/COMPOSING DEVICE", proposes a unique voice signal edit processing technique. In this technique, the voice data is decomposed into voice data pieces as the elements making up a voice message and is stored in the form of the voice data pieces. These voice data pieces are read out and edited so as to compose a voice message being naturally sounded.

Japanese Patent Unexamined Publication No. Hei. 2-131060, entitled "METHOD OF EDITING VOICE MESSAGES", proposes another voice signal edit processing technique. In this technique, voice message data is divided into voice data blocks before stored, and is stored in the form of voice data blocks. Data for specifying the voice data blocks are attached to the voice data blocks. The voice message data is edited by editing the array of the data to specify the voice blocks.

In the conventional systems which handle sound signals and variously process the sound data, the sound signal is divided into fragmental sound signals and stored in this state. In reproducing the sound signal, the fragmental sound pieces, which meet the conditions for reproduction, are gathered. Thus, the conventional sound processing technique divides the sound signal into fragmental data pieces, stores in this state, and gathers only necessary data pieces and reproduces them. It is noted here that the sound signal per se is not processed in any way.

A conventional sound processing system, which is capable of processing the sound signal per se, will be described. FIG. 14 is a block diagram showing the arrangement of a conventional sound processing system and signal flows in the system. In the figure, reference numeral 121 designates input sound information; 122, a microphone; 123, an A/D converter; 124, a sound data processor; 125, a voice recognition processor; 126, a sound edit processor; 127, a sound data storing portion; 128, a D/A converter; 129, a speaker; 130, recognition result character data; and 131, output aural information.

The input sound information 121 is input to the system through the microphone 122, and converted into an electrical sound signal. The sound signal is converted into a digital sound data signal by the A/D converter 123, and applied to the sound data processor 124. The sound data processor 124 includes several processing components for processing the sound data signal, such as the voice recognition processor 125, the sound edit processor 126 and the sound data storing portion 127. When the input sound signal is a voice signal, the sound recognition processor 125 carries out a voice recognition process and produces the recognition result character data 130. The sound edit processor 126 directly processes the received digital sound data for the edit purposes. The sound data storing portion 127 stores the received digital sound data. The digital sound data is directly output from the sound data storing portion 127 or output after edited by the sound edit processor 126. The digital sound data thus output is input to the D/A converter 128 where it is converted into an analog sound signal. The analog sound signal drives the speaker 129 which in turn outputs the aural information 131.

The sound processing system thus arranged and operated handles the input sound signal in two ways. In the first way, when the input sound signal is a voice signal, the system carries out a voice recognition process for recognizing the voice. By the recognition process, the voice data is converted into character data. The system carries out a sound process using the character data. In the second way, the sound data is processed as they are.

In the first way, the input sound information 121 is converted into an electrical analog sound signal by the microphone 122. The analog sound signal is converted into a digital sound data signal by the A/D converter 123. When the digital sound data includes voice data components, only the voice data components are processed for recognition by the voice recognition processor 125. Thereafter, the processor 125 produces the recognition result character data 130. When the voice component of the input sound information 121 is not articulate or it is unclear whether or not the input sound information 121 includes voice components, the voice recognition processor 125 processes the whole digital sound data of the input sound information 121 for voice recognition.

In the second way, the input sound information 121 is converted into an electrical analog sound signal by the microphone 122. The analog sound signal is converted into a digital sound data signal by the A/D converter 123. The converted digital sound data is stored into the sound data storing portion 127 directly or after it is edited by the sound edit processor 126. The edit process is carried out in an interactive manner. An operator specifies the segments (data blocks) of the digital sound data to be stored, and determines necessary segments, while repeating the reproduction of the data segments. He designates indices indicative of the segments (e.g., block numbers). Then, he cuts out desired digital sound data and stores them into the sound data storing portion 127. In this case, one or more segments may be used in combination later by using the indices (block numbers).

To use the stored digital sound data, the digital sound data is output through the sound edit processor 126 from the sound data storing portion 127 or directly from the sound data storing portion 127. The thus output digital sound data is input to the D/A converter 128 where it is converted into an analog sound signal. The analog sound signal drives the speaker 129 which in turn produces the aural information 131.

In the FIG. 14 sound processing system thus constructed, when the digital sound data once used is used again later, the operator cuts necessary data portion out of the digital sound data. In this case, the operator must check the necessary data portion by repeating the reproduction of the digital sound data. This work is time consuming and troublesome. In the case of the digital sound data containing voice data, it is frequently impossible to specify the positions of the voice data in the digital sound data. When this type of the digital sound data is processed for voice recognition, the sound processing system inevitably processes unnecessary data portions, in addition to necessary data portion (i.e., voice data portion). This indicates that the amount of data to be processed by the sound processing system is increased.

Assuming that the sampling frequency for digitizing the sound signal is fs (Hz), and the number of quantizing bits is n, the amount M (bits/sec) of data to be processed for one second is expressed by the following equation.

$M = fs \times n$ (bits/sec)

In a specific case where fs=8000 (Hz) and n=12 (bits), the data amount M=96000 (bits/sec). That is, the whole sound data is processed at the processing rate of this figure. In the case of the digital sound data containing the voice data, the processing system must process an additional amount of data (defined by the above figure), i.e., the unnecessary data portion.

SUMMARY OF THE INVENTION

The present invention has been made in view of the above circumstances and has an object to provide a sound processing system which can efficiently process digitized sound data signals.

Another object of the present invention is to provide a sound processing system which can efficiently analyze the feature quantities of a sound signal.

To achieve the above objects, the invention provides a sound processing system including sound data storing means for storing a sound signal in the form of digital sound data, index data storing means for storing index data indicative of the quantity of feature of the sound signal in association with the digital sound data, and data processing means for processing the digital sound data in accordance with the index data.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

FIG. 4 is a diagram showing an example of a data format in which a plurality of pieces of index data are assigned and attached to one piece of digital sound data;

DETAILED DESCRIPTION OF THE PREFERRED EMBODIMENTS

The specific embodiments of the present invention will be described with reference to the accompanying drawings.

Figure 1:
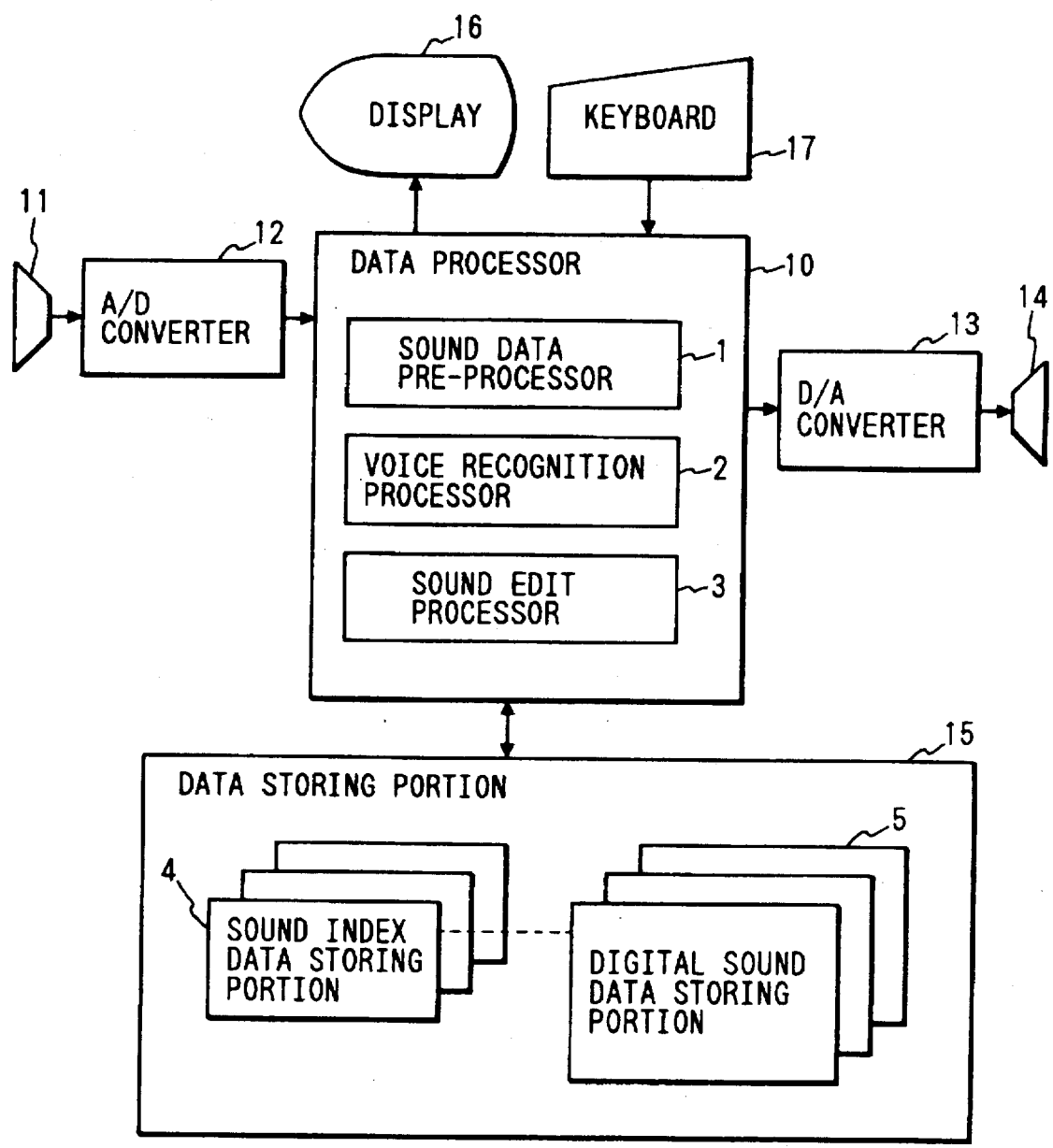
FIG. 1 is a block diagram showing the arrangement of a key portion of a sound processing system according to an embodiment of the present invention.

Referring to FIG. 1, there is illustrated in block form the arrangement of a key portion of a sound processing system according to an embodiment of the present invention. In the figure, reference numeral 10 designates a data processor; 11, a microphone; 12, an A/D converter; 13, a D/A converter; 14, a speaker; 15, a data storing portion; 16, a display device; and 17, a keyboard. The data processor 10 includes a sound data pre-processor 1, a voice recognition processor 2, and a sound edit processor 3. The data storing portion 15 includes a sound index data storing portion 4 and a digital sound data storing portion 5.

In the sound processing system, the microphone 11 receives sound information and converts it into an electrical analog signal. The A/D converter 12 receives the analog signal and converts it into a digital signal for ease of handling the sound signals in the sound processing system. The digitized sound data signal is appropriately processed by the data processor 10 and thereafter stored into the data storing portion 15. Alternatively, the digital sound data signal is directly stored into the data storing portion 15, from the data processor 10. The digital sound data is read out of the data storing portion 15 and properly processed by the data processor 10, and output therefrom to the D/A converter 13. The D/A converter 13 converts the received digital sound data signal into an analog sound signal. The analog sound signal drives the speaker 14 which produces aural information. The processing of the digital sound data progresses in a manner that the user interactively communicates with the data processor 10 with the aid of a graphical user interface (GUI) including the display device 16 and the keyboard 17.

For the digital sound data processing, the data processor 10, as described above, includes digital sound data processing components, such as the sound data pre-processor 1, the voice recognition processor 2, and the sound edit processor 3. To be described in detail later, the sound data pre-processor 1 analyzes the digital sound data signal, extracts the features of the digital sound data signal, prepares index data of the quantities of the features of the sound data signal, and assigns the index data to the digital sound data. The voice recognition processor 2 efficiently carries out a voice recognition process of the digital sound data in accordance with the index data of the feature quantities of the sound signal of the digital sound data that is prepared by the sound data pre-processor 1. The sound edit processor 3 efficiently carries out an edit process of the sound data also in accordance with the index data of the feature quantities prepared by the sound data pre-processor 1.

In the data storing portion 15, which as already stated, includes the sound index data storing portion 4 and the digital sound data storing portion 5, the sound index data storing portion 4 stores the index data of the feature quantities prepared by the sound data pre-processor 1, and the digital sound data storing portion 5 stores the digital sound data. The index data of the feature quantities of the sound signal are assigned to the digital sound data, as described above. Therefore, the digital sound data, together with the data assignment, is stored into the digital sound data storing portion 5.

Figure 2:
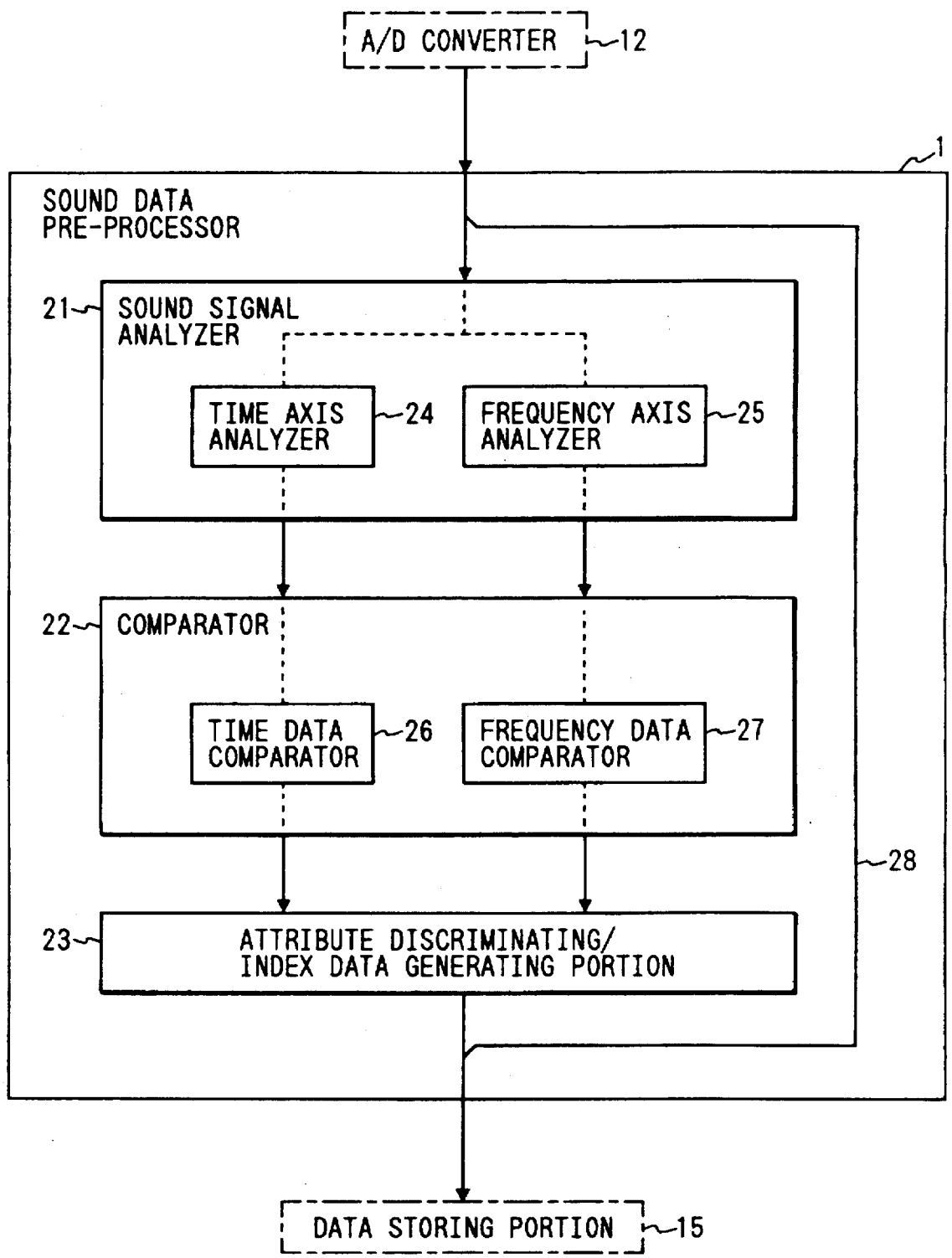
FIG. 2 is a block diagram showing the arrangement of a key portion of a sound data pre-processor in the sound processing system of FIG. 1.

FIG. 2 is a block diagram showing the arrangement of a key portion of the sound data pre-processor 1 in the sound processing system of FIG. 1. As shown, the sound data pre-processor 1 is connected at the input terminal to the A/D converter 12 and at the output terminal to the data storing portion 15. The sound data pre-processor 1 includes a sound signal analyzer 21, a comparator 22, and an attribute discriminating/index data generating portion 23. The sound signal analyzer 21 includes two analyzers, a time axis analyzer 24 and a frequency axis analyzer 25. The time axis analyzer 24 analyzes the sound data signal to extract the quantity of physical feature of the sound signal (sound signal waveform) on the time axis. The frequency axis analyzer 25 analyzes the sound data signal to extract the quantity of physical feature of the sound signal (sound signal waveform) on the frequency axis.

The quantities of the extracted physical features of the sound signal are output from the analyzers in the sound signal analyzer 21 to the comparator 22. In the comparator, these feature quantities are subjected to multi-level comparisons. The results are used as parameters for attribute discrimination. In the comparator 22 including a time data comparator 26 and a frequency data comparator 27, the time data comparator 26 produces the number of zero-crossings of the sound data signal through time comparisons for each unit time. The frequency data comparator 27 carries out a comparison process. In the comparison process, the sound data signal takes the form of harmonics structure for the comparisons of the power amplitudes in the frequency domain. Further, in the comparator 22, the sound data signal is compared with a single or a plurality of threshold values in accordance with the physical feature quantities.

The attribute discriminating/index data generating portion 23 discriminates a single or a plurality of predetermined attributes on the basis of the comparison results by the comparator 22, generates index data of the feature quantities of the sound signal, and assigns and attaches the generated index data to the corresponding data segments (to be given later) of the digital sound data coming through the signal path 28. In this way, the sound data pre-processor 1 outputs the digital sound data with the index data attached thereto and stores it into the data storing portion 15.

Figure 3:
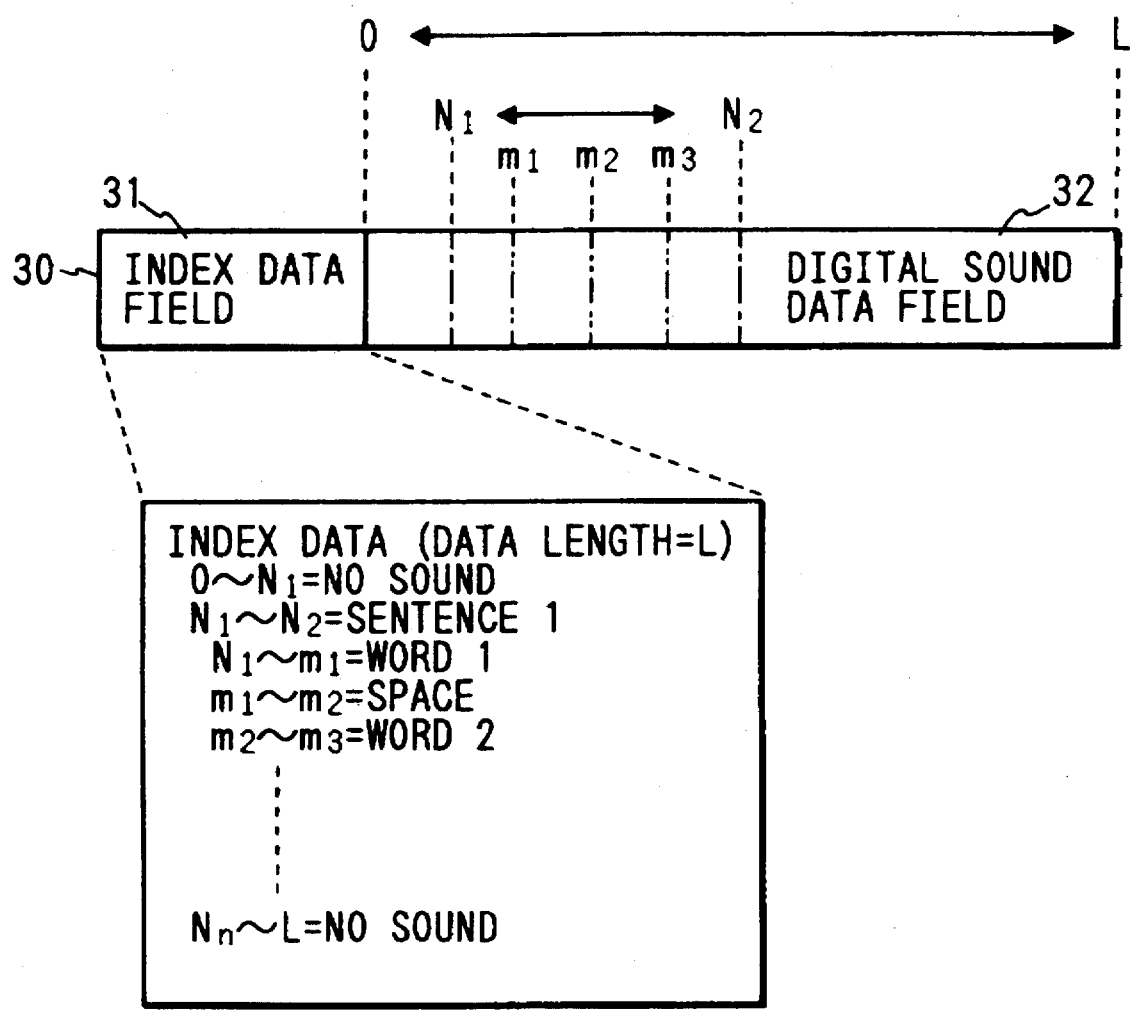
FIG. 3 is a diagram showing an example of a data format in which index data is assigned and attached to the digital sound data.

FIG. 3 is a diagram showing a data format containing index data assigned and attached to the digital sound data, specifically the segmental data of the digital sound data. As shown in FIG. 3, in a data format 30 of the digital sound data, an index data field 31 is attached to the header of the data block, and a digital sound data field 32 is located following the index data field 31. The index data field 31, as illustrated in the lower part of the drawing, contains the data length (=L) of the digital sound data, and the feature quantities of unit segments of the digital sound data. In this instance of the digital sound data, index data representative of no sound is assigned and attached to the segment of 0 to $N_1$ of the sound data; index data representative of sentence 1, to the segment $N_1$ to $N_2$; . . . ; and index data representative of no sound, to the segment $N_n$ to L. Index data indicative of word 1 is assigned and attached to the segment $N_1$ to $m_1$ in the sentence 1 segment $N_1$ to $N_2$; index data indicative of space between the adjacent words, to the segment $m_1$ to $m_2$ of the segment $N_1$ to $N_2$; and index data of word 2, to the segment $m_2$ to $m_3$.

As described above, the feature quantities of the sound signal of the digital sound data, which is time sequential and large in data amount, are extracted from the digital sound data, thereby forming index data. The index data are assigned and attached to the corresponding segments of the digital sound data. In the sound process to be carried out later, the segmental sound data specified by the index data are selectively picked up from the digital sound data, and only those segmental sound data are processed. Accordingly, the data processing for the sound process can be efficiently performed. A voice recognition process will be described using the instance of FIG. 3. In the voice recognition, the voice recognition processor 2 discriminates the segmental sound data of no sound referring to the index data and enters the voice recognition process while omitting the processing of the no sound segments. Therefore, the amount of data to be processed for the voice recognition can be reduced remarkably. If required, only the segmental sound data of the words may be processed for the voice recognition.

FIG. 4 is a diagram showing another data format containing index data assigned and attached to the digital sound data. In this sound data, a plurality of pieces of index data are assigned and attached to one piece of digital sound data. As illustrated in the upper portion of FIG. 4, plural types of feature quantities of the sound signal can be extracted from digital sound data 40. For the sound index data 41 of the sound signal, as shown in the lower portion of FIG. 4, four types of index data, index data A, B, C, and D, are generated. These four types of index data are assigned and attached to the segmental data of the digital sound data 40.

The index data A is used for discriminatively indicating the voice part of the digital sound signal. To prepare the index data A, the sound signal is analyzed on the time axis and the frequency axis, thereby obtaining the physical features of the sound signal. The quantities of the features of the voice part of the sound signal are extracted from the physical feature quantities as the results of the analyses.

Index data representative of the feature quantities of sentence 1, sentence 2, . . . , sentence m, are generated for the index data of the feature quantities of the sound signal, and assigned and attached to the segments of the sound data, which define these feature quantities. The index data B also discriminatively specifies the feature quantities of the voice part. To discriminate speakers, a threshold process is carried out using the physical features of the sound signal that are obtained by the time axis analysis and the frequency axis analysis. The feature quantities on the speakers are extracted through the threshold process. The index data of the feature quantities of speaker 1, speaker 2, . . . are generated for the index data of the feature quantities of the sound signal, and assigned and attached to the segments of the sound data, which define these feature quantities.

Another index data C of the digital sound data follows. The index data C discriminatively indicates musical tones of the digital sound data. The physical features of the sound signal resulting from the time axis analysis and the frequency axis analysis are subjected to a threshold process to discriminate musical tone segments. Through the threshold process, the feature quantities of musical tones, i.e., musical tone 1, musical tone 2, . . . , are extracted. The index data of those feature quantities are generated, and assigned and attached to the segments of the sound data, which define these feature quantities. An additional index data D of the digital sound data is used for discriminatively indicating another type of sound source. The physical features of the sound signal resulting from the time axis analysis and the frequency axis analysis are subjected to a threshold process to discriminate sound effect segments. Through the threshold process, the feature quantities of sound effects, i.e., sound effect 1, sound effect 2, . . . , are extracted. The index data of those feature quantities are generated, and assigned and attached to the segments of the sound data, which define these feature quantities.

Thus, the plural types of feature quantities of index data 41 are extracted from one piece of digital sound data 40. The plural types of index data (index data A to index data D), which are provided for the plural types of feature quantities of the sound signal, are assigned and attached to the segments of the sound data, which define those feature quantities.

As described above, the plural types of the feature quantities of the sound signal of the digital sound data, which is time sequential and large in data amount, are extracted from the digital sound data, thereby forming the plural types of index data. The index data are assigned and attached to the corresponding segments of the digital sound data. In the sound process to be carried out later, the segmental sound data specified by the index data are selectively picked up from the digital sound data in accordance with the contents of the sound process, and only those segmental sound data are processed. Accordingly, the data processing for the sound process can be efficiently performed. In a sound edit process, for example, the sound edit processor 3 discriminates the segmental sound data of no sound referring to the index data A and enters the edit process, while omitting the processing of the no sound segments. Therefore, the amount of data to be processed for the sound edit process can be reduced remarkably. In the case of a voice recognition process, the voice of only a specific speaker can continuously be recognized by using the index data B of the feature quantities for speaker discrimination.

How to extract the feature quantities of the digital sound data will be described. In this instance of the embodiment, the feature quantities to be extracted for index data generation are those of no sound segments of the sound data.

To extract the feature quantities of the no sound/sound segments, the amplitudes of the energy E of the sound signal for each unit segment L, and the number of zero-crossings of the sound signal are extracted as the feature quantities, in this instance.

a) The following energy equation is calculated.

$$E=(1/L)\cdot\Sigma(x[k])^2 \qquad (1)$$

In the above equation, x[k] indicates a data train of the digital sound data, L indicates a fixed segment of the sound data, k indicates the subsegments of the segment L, and k=1 to k=L. That is, by calculating the equation (1), the energy E is obtained for each subsegment of the fixed segment of the sound data.

b) The number zc of zero-crossings of the sound signal for each subsegment of the fixed segment L is obtained by carrying out the operation process of the following program description.

zc=0;
for i=0 or i<L $$\text{if } ((x[i] \times x[i+1])<0) \; zc=zc+1; \qquad (2)$$

c) The energy E and the number zc of zero-crossings of the sound signal, thus obtained, are threshold processed. Through the threshold process, the subsegments where the energy E is small, the number zc of zero-crossings is small, and the duration t is relatively long, are discriminated and extracted as the feature quantities representing no sound segments. In this way, index data of the feature quantities of the sound data is formed.

In a specific threshold process for the energy E, the number zc of zero-crossings, and the duration t, if the following condition is satisfied, the segment under discrimination is determined to be a no sound segment.

$$E>TE \text{ and } zc<Tz \text{ and } t>Tt,$$

where TE, Tz, and Tt are the threshold values for the parameters of the feature quantities of the energy E, the number zc of zero-crossings, and the duration t. Then, index data indicating the no-sound segments thus discriminated is generated.

Figure 5:
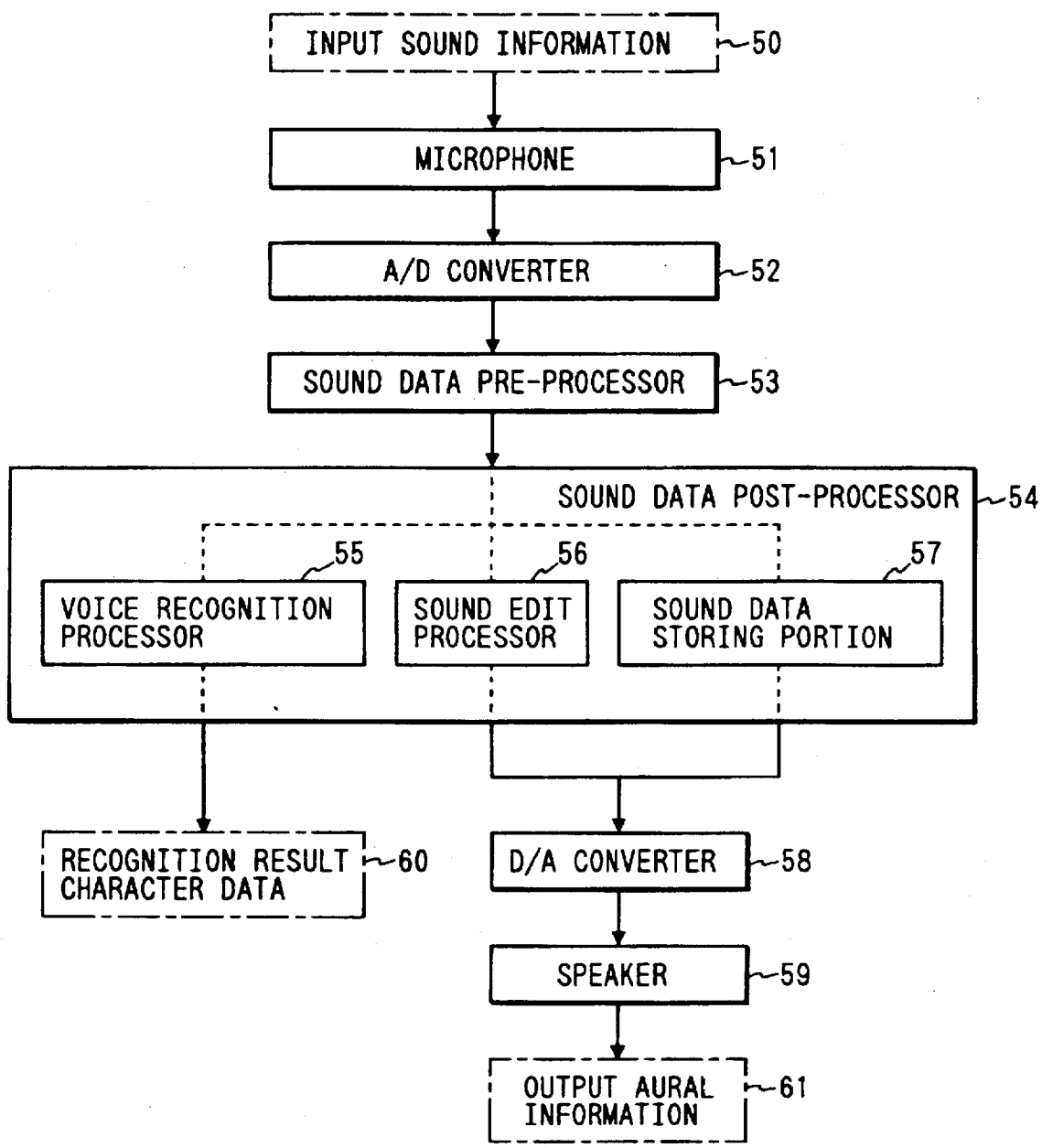
FIG. 5 is a block diagram showing the arrangement of a sound processing system according to another embodiment of the present invention.

A flow of the whole sound process in the sound processing system thus arranged will be described. FIG. 5 is a block diagram showing the arrangement of a sound processing system according to another embodiment of the present invention. In FIG. 5, reference numeral 50 designates input sound information; 51, a microphone; 52, an A/D converter; 53, a sound data pre-processor; 54, a sound data post-processor; 55, a voice recognition processor; and 56, a sound edit processor. Reference numeral 57 designates a sound data storing portion; 58, a D/A converter; 59, a speaker; 60, a recognition result character data; and 61, output aural information.

The input sound information 50 is input to the microphone 51 where it is converted into an electrical analog sound signal. The analog sound signal is converted into a digital sound data signal by the A/D converter 52. The digital sound data is then input to the sound data pre-processor 53. The sound data pre-processor 53, as described above, analyzes the received digital sound data, i.e., the waveform of the sound signal that now takes the form of digital sound data, extracts the feature quantities of the sound signal, generates the index data of the extracted feature quantities, and assigns and attaches the index data to the digital sound data.

The sound data post-processor 54, which processes the digital sound data for sound process, includes sound processing components, such as the voice recognition processor 55, the sound edit processor 56, and the sound data storing portion 57. The voice recognition processor 55 efficiently carries out a voice recognition process of the digital sound data in accordance with the index data of the feature quantities of the sound signal that is prepared by the sound data pre-processor 53. The sound edit processor 56 efficiently carries out an edit process of the sound data also in accordance with the index data of the feature quantities prepared by the sound data pre-processor 53. The sound data storing portion 57 stores the thus processed digital sound data and the index data, and the like.

The digital sound data is output from the sound data post-processor 54 in two ways. In the first data output way, the digital sound data is directly output from the sound data storing portion 57. In the second data output way, the digital sound data, after edited by the sound edit processor 56, is output. The digital sound data thus output is input to the D/A converter 58 where it is converted into an analog sound signal. The analog sound signal drives the speaker 59 to generate the output aural information 61.

Figure 6:
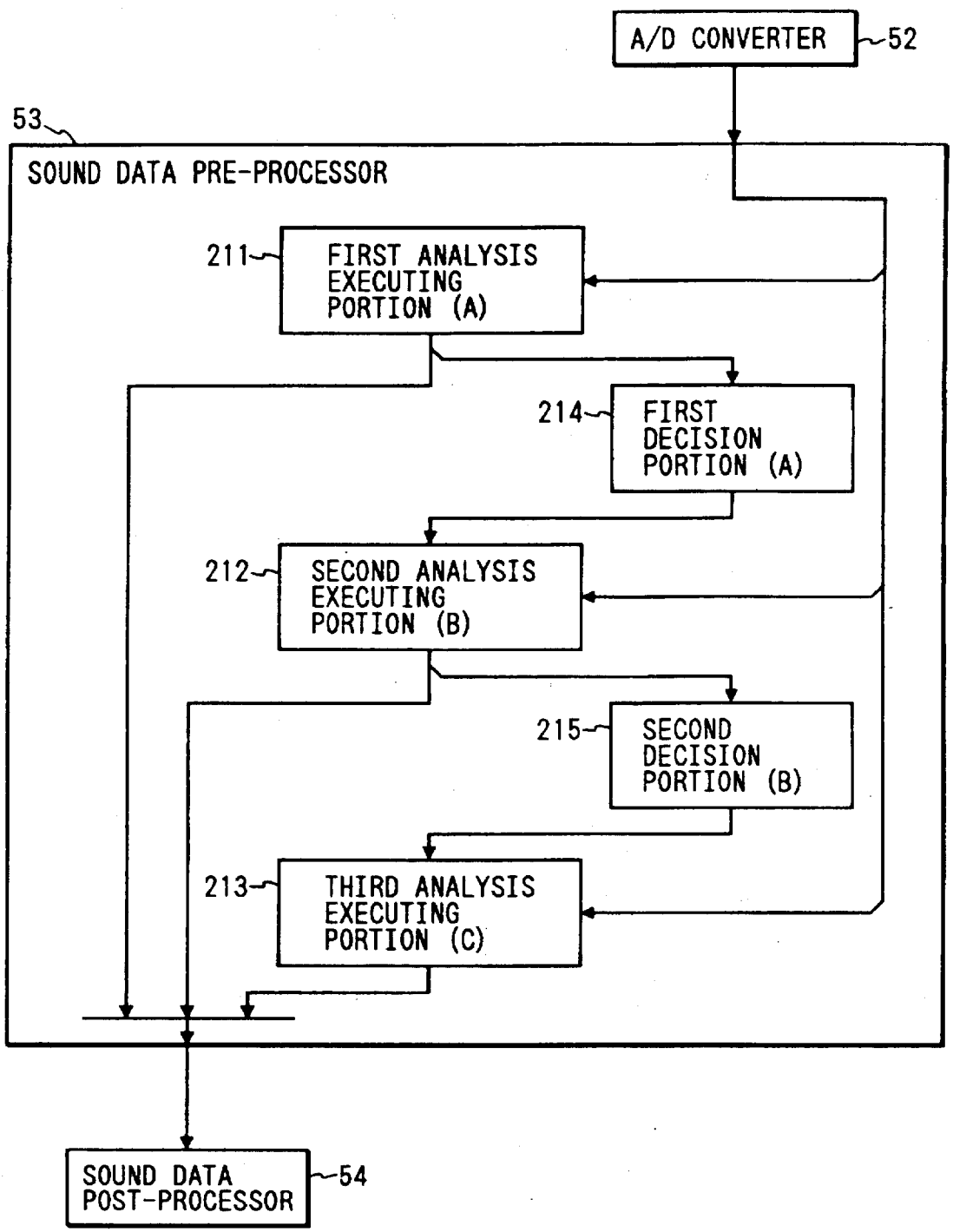
FIG. 6 is a block diagram showing the arrangement of a sound data pre-processor that may be used in the sound processing system of FIG. 5.

Next, the sound data pre-processor of the sound processing system will be described in detail. FIG. 6 is a block diagram showing the arrangement of a sound data preprocessor that may be used in the sound processing system of FIG. 5. In the figure, reference numeral 211 designates a first analysis executing portion; 212, a second analysis executing portion; 213, a third analysis executing portion; 214, a first decision portion; and 215, a second decision portion.

The sound data pre-processor 53 includes a plurality of analysis executing portions for extracting the feature quantities of the sound signal to analyze the sound signal. In this case, in order that one analysis executing portion analyzes the sound data on the basis of the result of the processing of the preceding analysis executing portion, the control signal paths in the analysis/discrimination stages are connected in a cascaded fashion, as shown in FIG. 6.

In the sound data pre-processor 53, the digital sound data from the A/D converter 52 is input to the first to third analysis executing portions 211 to 213. The first analysis executing portion 211 analyzes the digital sound data, to extract the feature quantity (A) from the digital sound data. The extracted feature quantity (A) is transferred to the sound data post-processor 54 and to the first decision portion 214. The first decision portion 214 compares the feature quantity (A) with a single threshold value or a plurality of threshold values. The data of the segment as determined to be significant through the comparison is applied as a control signal to the second analysis executing portion 212.

The data of each segment of the digital sound data that is discriminated to be significant by the first decision portion 214, is transferred as a control signal to the second analysis executing portion 212. In accordance with the control signal, the second analysis executing portion 212 analyzes only the significant data of the segments and extracts the feature quantity (B) from the digital sound data. As in the preceding stage, the feature quantity (B) output from the second analysis executing portion 212 is output to the sound data post-processor 54 and input to the second decision portion 215.

Also in the second decision portion 215, the feature quantity (B) is compared with a single threshold value or a plurality of threshold values as in the previous stage. The data of each segment of the digital sound data that is discriminated as significant data is transferred as a control signal to the third analysis executing portion 213. In accordance with the control signal, the third analysis executing portion 213 analyzes only the significant data of the segments and extracts the feature quantity (C) from the digital sound data. As in the preceding stage, the feature quantity (C) output from the third analysis executing portion 213 is output to the sound data post-processor 54.

In this manner, the feature quantities (A), (B), and (C) extracted by the sound data pre-processor 53 are transferred to the sound data post-processor 54.

As described above, in the sound data pre-processor 53, the first to third analysis executing portions 211, 212, and 213 extract the feature quantities (A), (B), and (C). In this case, one analysis executing portion analyzes the sound data of only the significant segments on the basis of the result of discriminating the feature quantities by the analysis executing portion of the preceding stage. Accordingly, the feature quantities extraction process can be efficiently carried out. If the preceding stage of analysis/discrimination determines that almost half of the voice data of a speech belong to the no sound segments, the subsequent analysis will be carried out omitting the voice data of the no sound segments. As a result, the amount of the processed data is reduced to the half.

As stated above, in the sound data pre-processor 53, the control signal, which is applied from one analysis executing portion to the subsequent analysis executing portion, contains only the segmental data of the data to be analyzed, which results from the analysis of the sound data by the analysis executing portion of the preceding stage. In the illustrated sound data pre-processor 53, the data to be analyzed is the digital sound data received directly from the A/D converter 52. If required, the sound data pre-processor 53 may be modified such that the succeeding analysis executing portion receives the analysis result from the preceding analysis executing portion and analyzes the received one successively.

Figure 7:
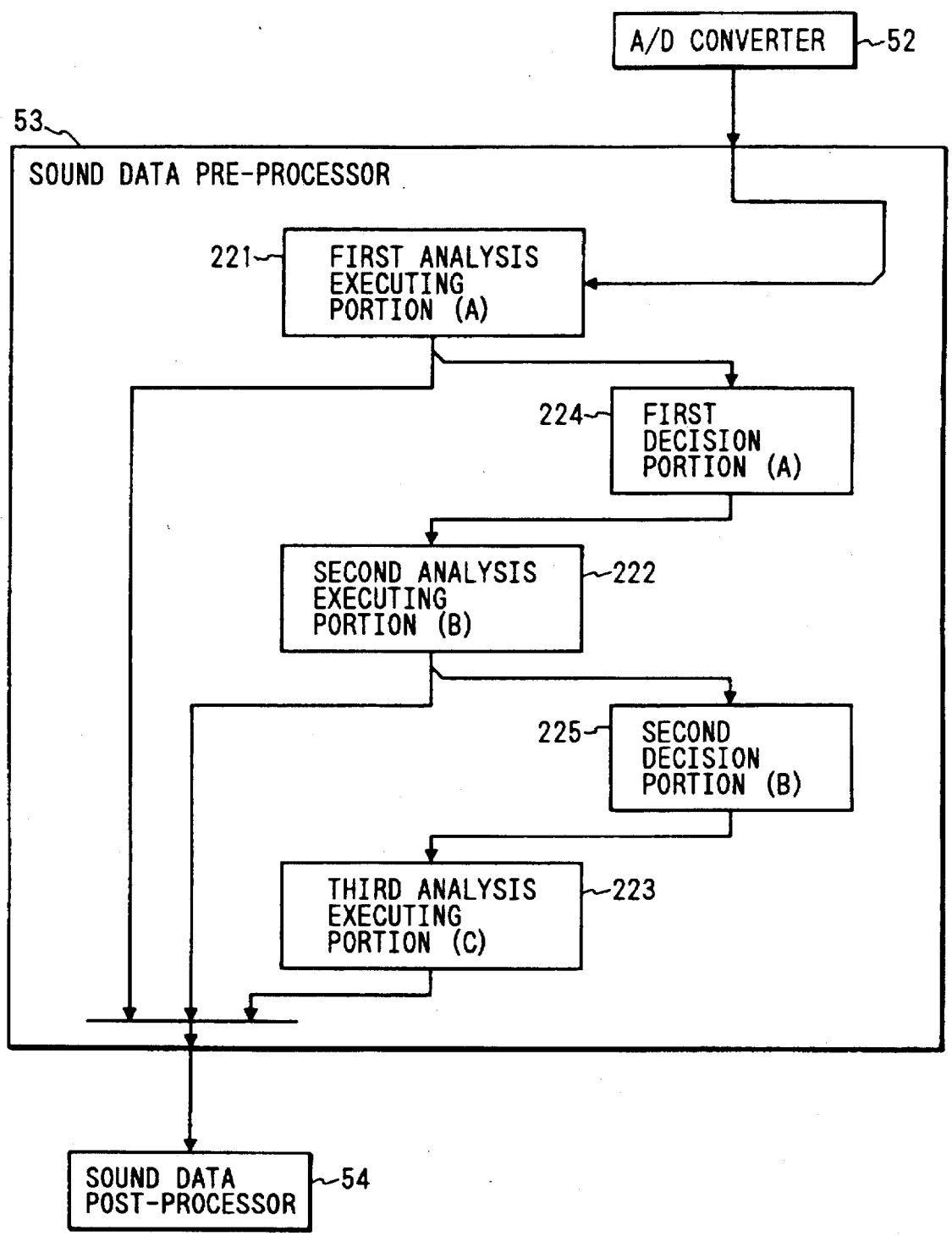
FIG. 7 is a block diagram showing the arrangement of another sound data pre-processor that may be used in the sound processing system of FIG. 5.

This modification of the sound data pre-processor will be described hereinafter with reference to FIG. 7. FIG. 7 is a block diagram showing the arrangement of another sound data pre-processor that may be used in the sound processing system of FIG. 5. In the figure, reference numeral 52 designates an A/D converter 52; 54, a sound data post-processor; 53, a sound data pre-processor; 221, a first analysis executing portion; 222, a second analysis executing portion; 223, a third analysis executing portion; 224, a first decision portion; and 225, a second decision portion. In the sound data pre-processor 53, as shown in FIG. 7, the first analysis executing portion 221, the first decision portion 224, the second analysis executing portion 222, the second decision portion 225, and the third analysis executing portion 223 are cascade-connected as signal processing paths.

The digital sound data is input from the A/D converter 52 to the sound data pre-processor 53. In the pre-processor, the first analysis executing portion 221 analyzes the digital sound data to extract the feature quantity (A) from the digital sound data. The feature quantity (A) is input to the first decision portion 224 where it is compared with a single or a plurality of threshold values. Sound data (A) of the segments of the input digital sound data, that are determined to be significant are transferred to the second analysis executing portion 222. The second analysis executing portion 222 extracts the feature quantity (B) from the sound data (A). The extracted feature quantity (B) is transferred to the second decision portion 225.

The second decision portion 225 compares the feature quantity (B) with a single or a plurality of threshold values, as in the previous case. As a result, sound data (B) of only the segments of the sound data (A) that are determined to be significant are extracted and transferred to the third analysis executing portion 223. The third analysis executing portion 223 analyzes the sound data (B) to extract the feature quantity (C). Those feature quantities (A), (B), and (C) thus extracted are output as the analysis result data of the digital sound data.

The operation of the sound data pre-processor thus arranged will be described with reference to FIG. 7. In the operation, the feature quantities of the voice data of a human being are obtained by analyzing the voice data. The number of zero-crossings, waveform energy of each segment of the sound data, and autocorrelation function are successively extracted from the voice data of the digital sound data as the feature quantities (A), (B), and (C).

It is known that in the voice of a human being, the sound part occupies substantially the half of the voice. When examining the data segment of no sound, the number zc of zero-crossings for the segments of no sound is extremely small. Therefore, the number zc of zero-crossings is used for the feature quantity (A) to be extracted by the first analysis executing portion 221. The first analysis executing portion 221 extracts the number zc of zero-crossings, and the first decision portion 224 determines that the data segment where the number zc of zero-crossings is smaller than a predetermined value Tz is the data segment of no sound. The voice data of the no sound data segment is not analyzed by the next and subsequent analysis executing portions.

The next analyzing process extracts the waveform energy of the sound signal as the feature quantity (B). It is known that the energy of the vowel part is relatively large in the voice of a human being. Accordingly, the waveform energy of the sound signal is extracted by the second analysis executing portion 222. The second decision portion 225 determines that the data segment where the waveform energy E for a fixed segment is larger than a fixed value Ez is determined to be a vowel segment. Other data segments than the vowel segments are determined to be segments of consonant. The fact that a small correlation exists between the waveforms of consonant has also known. In the next analyzing process, a process for making a decision about the autocorrelation of the consonant segments is not carried out. Therefore, the amount of data for the process to make a decision about the autocorrelation can remarkably be reduced in the analysis executing process. In other words, the analysis executing process can be carried out efficiently.

The next analyzing process extracts the autocorrelation function of the waveforms of the sound signal as the feature quantity (C) only for the segments that are determined to be vowel segments. The third analysis executing portion 223 calculates the autocorrelation function up to a predetermined degree N.

To be more specific, the first analysis executing portion 221 executes the following data processing in order to extract the number zc of zero-crossings as the feature quantity (A).

Assuming that a data train of the digital sound data of a sound signal of the voice of a human being is x[k], and the number of zero-crossings for a segment or interval [t1, t2] is zc, zc=0;
for i=t1 to t2<L if $((x[i] \times x[i+1]) < 0$ $zc=zc+1$;     (3)

The first decision portion 224 executes the following data processing to make a decision about the number zc of zero-crossings that is obtained in the preceding analyzing process.

For the number zc of zero-crossings for a segment F, if zc>Tz, then the segment F is transferred to the next analysis executing portion.

The second analysis executing portion 222 performs the following data processing in order to obtain the waveform energy for a fixed interval L for the feature quantity (B). That is, the second analysis executing portion 222 calculates the following equation (4) to obtain the waveform energy E of the sound signal every subinterval of the interval L.

$$E = (1/L) \cdot e(x[k]) \quad (4)$$

Then, the second decision portion 225 performs the following data processing on the magnitudes of the waveform energy E of the sound signals for the subintervals that are calculated by the second analysis executing portion 222.

For the energy E for a given interval F, if E>Ez, then the interval F is transferred to the next analysis executing portion (C).

The third analysis executing portion 223 executes the following data processing in order to obtain an autocorrelation function c(m) of N degree for the feature quantity (C). That is, the third analysis executing portion 223 calculates the following autocorrelation function c(m) for a given interval.

$$c(m) = (1/L) \cdot \Sigma(x[k] \times x[k+m])$$

$$(m=0, 1, \ldots, N) \quad (5)$$

In this process, the calculating process is carried out in the range from m=1 to m=N, because the autocorrelation of m=0 has been calculated by the second analysis executing portion 222.

Thus, in the analysis execution of the voice data of a human being, the process for obtaining the number of zero-crossings as the feature quantity (A) is carried out on the voice data ranging over the entire interval. The process for obtaining the energy E for each subinterval as the feature quantity (B), and the process for calculating the autocorrelation function c(m) as the feature quantity (C) are carried out only on the data portion that has been determined to be significant in the preceding stage. In this respect, the process of the analysis execution is more efficient than in the conventional processing system.

Next, description to follow is for a sound data processing of the digital sound data with index data by using the index data. The no sound intervals of the digital sound data can easily be discriminated by using the index data, in the sound processing system of the invention. Accordingly, it is possible to carry out such an edit process as to store the digital sound data not containing the data portion of no sound. Some data portion of no sound is required for the improvement of the articulation of the output aural information. For this reason, the index data for indicating the removed data portion of no sound is left.

Figure 8:
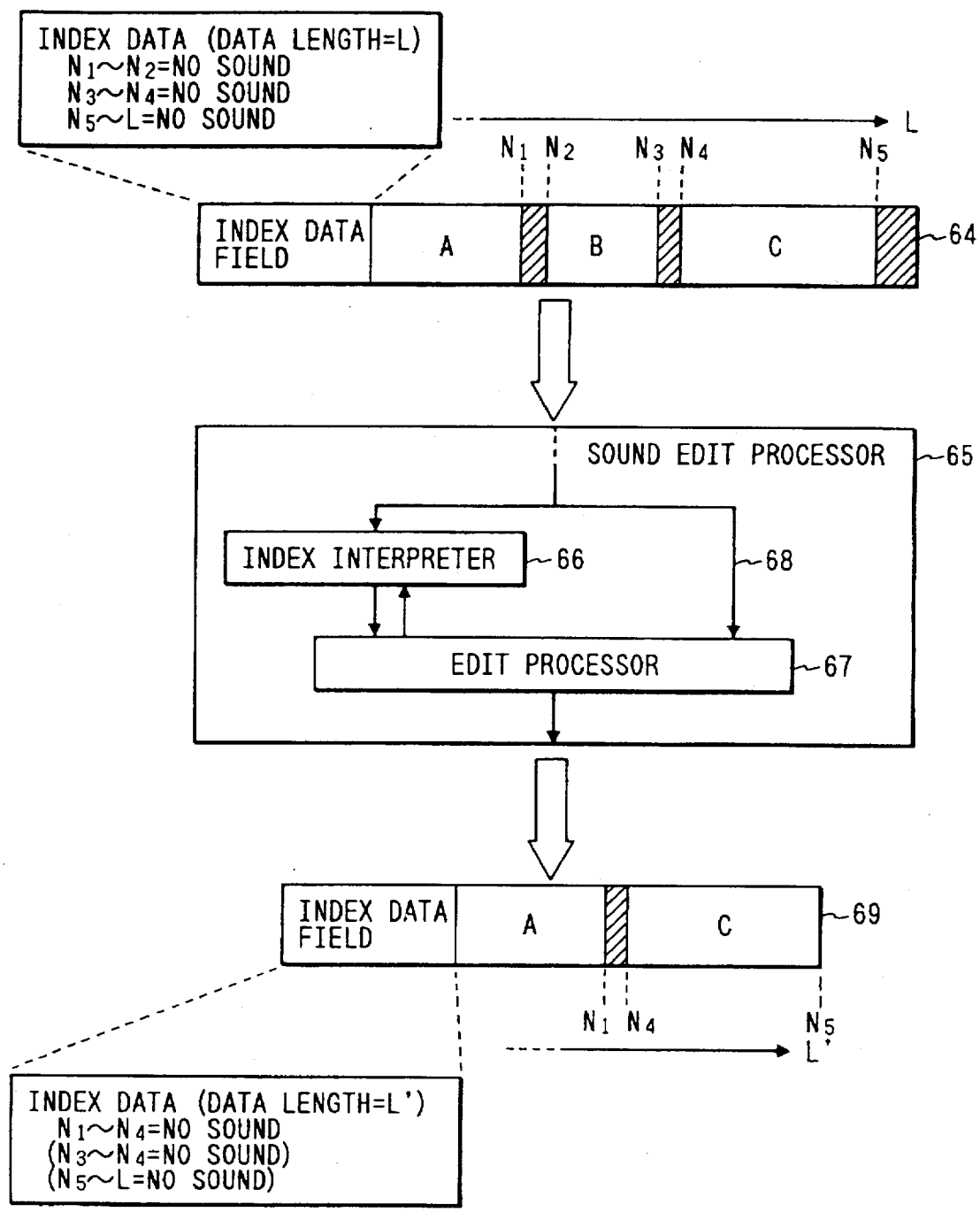
FIG. 8 is a diagram showing an example of an edit process of sound data that is carried out using index data by a sound edit processor.

FIG. 8 is a diagram showing an example of an edit process for editing digital sound data that is carried out using index data by a sound edit processor. As shown in FIG. 8, digital sound data 64 includes the index data indicative of the feature quantity of a sound signal before it is edited. The digital sound data 64 is input to a sound edit processor 65. An index interpreter 66 interprets the index data to discriminate the no sound segments of the digital sound data, and outputs the data of the no sound segments to an edit processor 67. The edit processor 67 performs an edit processing of the digital sound data 64 coming in through a signal path 68 in accordance with the segment information supplied from the index interpreter 66. In this edit processing, the segments of no sound are removed. After the edit processing, the edit processor 67 outputs the edited digital sound data 69 with the index data.

There is a case where sound edit processor 65 independently carries out an edit processing of the sound data after the digital sound data is stored into the sound data storing portion. In this case, the edit processor 67 inquires of the index interpreter 66 a given sound data portion of the digital sound data that is to be edited. In response to this inquiry, the index interpreter 66 interprets the index data of the digital sound data to be edited, and returns to the edit processor 67 a signal indicative of the contents of the index data for the corresponding sound data portion. In response to this signal, the edit processor 67 reads out only the sound data portion necessary for the edit processing, and executes the edit processing. If the result of the edit processing requires, new index data is prepared, and added to the edited digital sound data.

Figure 9:
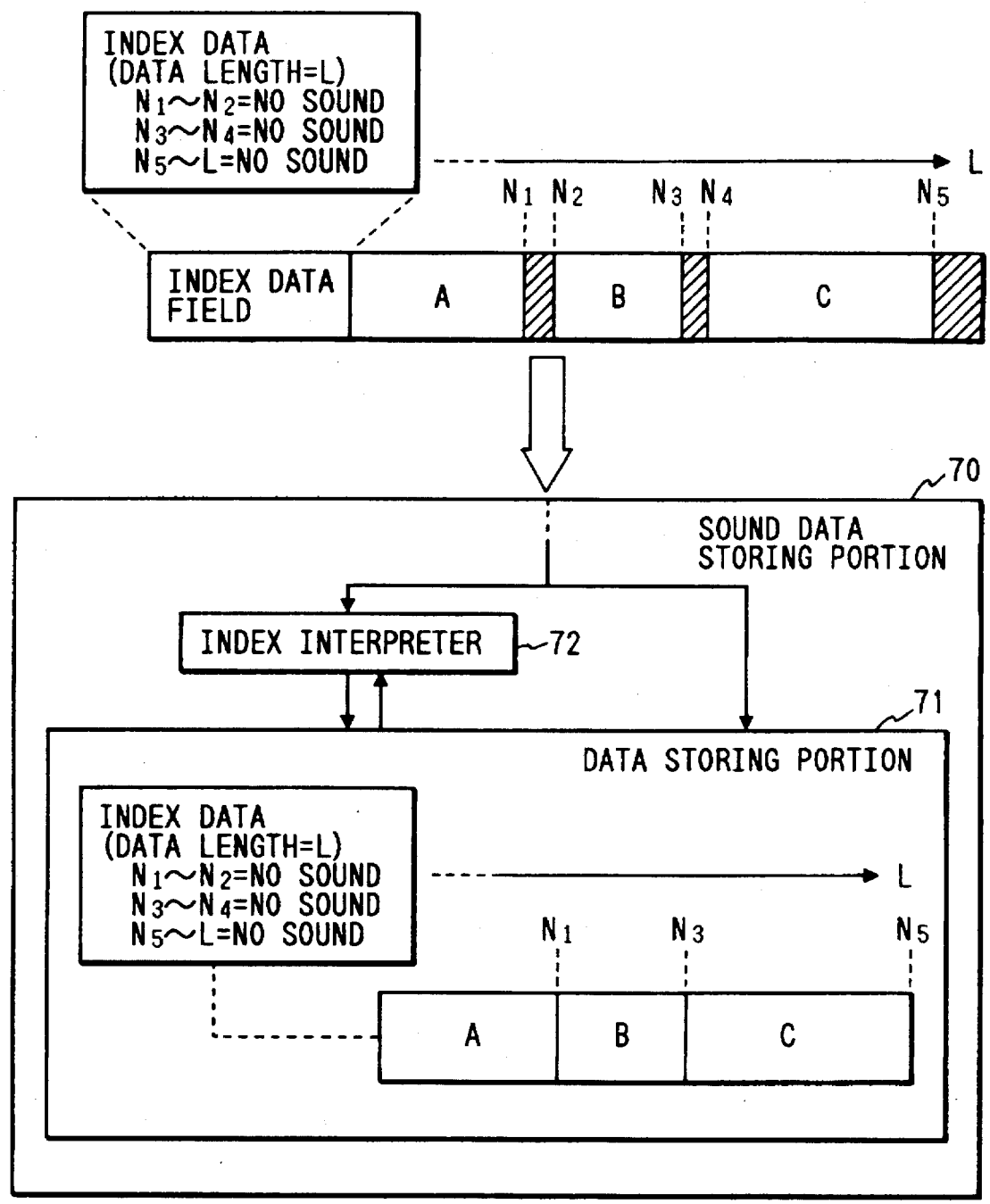
FIG. 9 is a diagram showing an example of the management of digital sound data using index data in a sound data storing portion.

FIG. 9 is a diagram showing an example of a process for the management of digital sound data using index data in a sound data storing portion. In the description thus far made, the sound data storing portion 57 functions merely to store the digital sound data and the index data. If required, the sound data storing portion may be arranged so as to independently manage the digital sound data stored therein. To realize this, a sound data storing portion 70 includes a data storing portion 71 and an index interpreter 72 for data management. The index interpreter 72 interprets the contents of the index data and the digital sound data is managed using the result of the index data interpretation.

In the process for the data management, the index interpreter 72 of the sound data storing portion 70 interprets the index data of the input digital sound data and extracts the segments of the digital sound data to be stored in the data storing portion 71. The segmental data and the index data associated therewith are allowed to be stored in the data storing portion 71. Accordingly, the data segments, which are determined to be those of no sound, are prohibited from being stored therein. The segment information on the segmental data of no sound is left in the index data portion. When the segmental data of no sound is required in reading out the digital sound data, e.g., in reproducing the same, or the sound signal, the segment information contained in the index data is used to reconstruct the segments of no sound, and the reconstructed segmental data of no sound is incorporated into the digital sound data.

Figure 10:
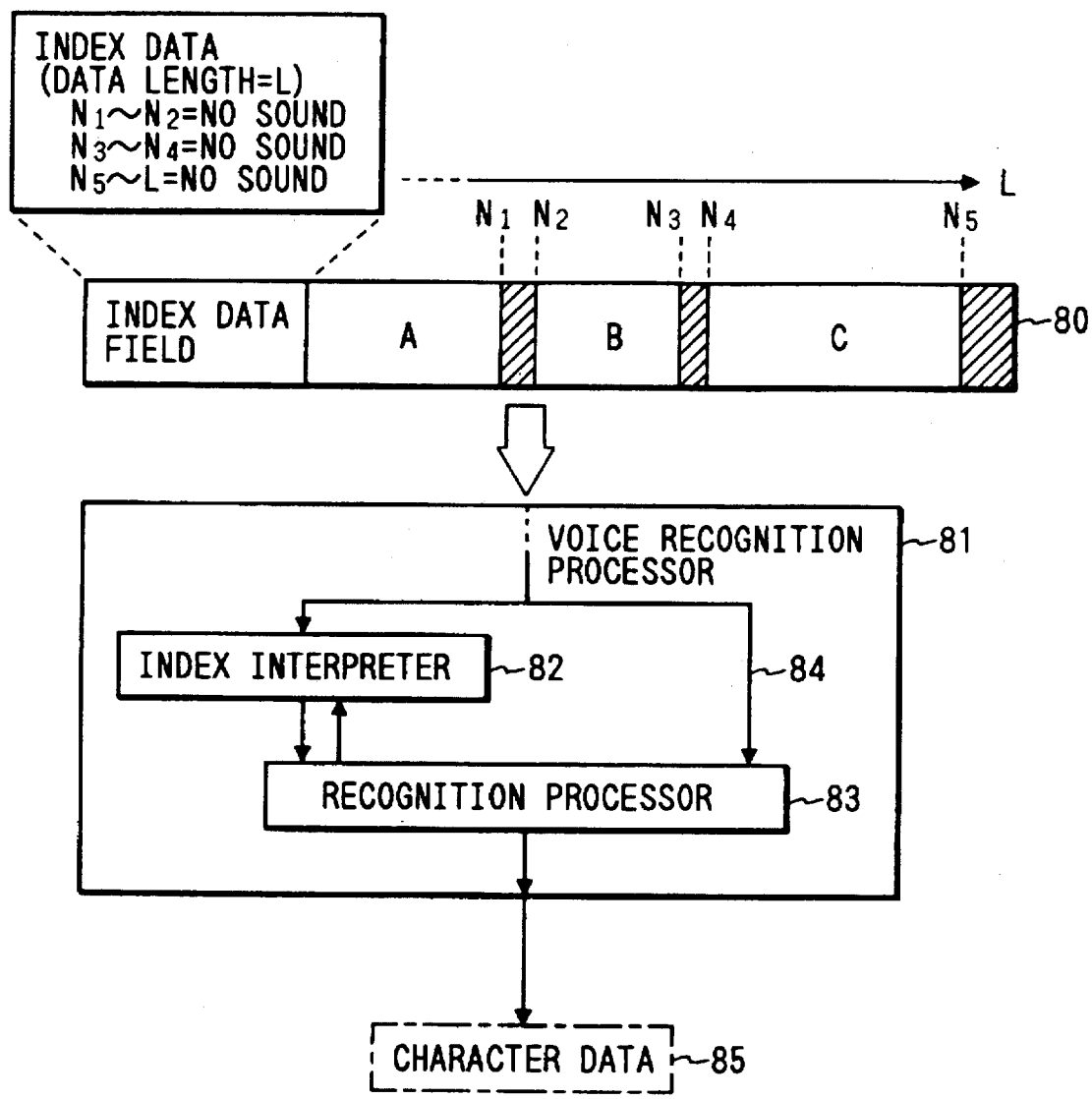
FIG. 10 is a diagram showing an example of a voice recognition process that is carried out using index data by a voice recognition processor.

FIG. 10 is a diagram showing an example of a voice recognition process that is efficiently carried out using index data by a voice recognition processor. As shown in FIG. 10, digital sound data 80 contains index data indicative of the feature quantities of a sound signal. When the digital sound data 80 is input to a voice recognition processor 81, an index interpreter 82 of the voice recognition processor 81 interprets the index data, and discriminates the voice segments of the digital sound data to be recognized. The index interpreter 82 sends segment information describing indicative of the voice segments to a recognition processor 83. In response to the segment information, the recognition processor 83 extracts only the voice data to be recognized from the digital sound data 80, and starts the recognition process, and outputs the result of character data 85.

Thus, the digital sound data 80 with the index data is input to the voice recognition processor 81. In the voice recognition processor 81, the index interpreter 82 interprets the contents of the index data contained in the digital sound data, and sends only the segmental data to be recognized to the recognition processor 83. The recognition processor 83 carries out the recognition process of the received segmental data, and converts the segmental data to characters or a series of characters. In this process, the index interpreter 82 prohibits the segments determined to be those of no sound from being sent to the recognition processor 83. Accordingly, only the data other than the segmental data of no sound are input to the recognition processor 83.

Next, a modification of the sound data pre-processor will be described. Any of the sound data pre-processors already described analyzes the digital sound data of a sound signal. To extract the physical feature quantities of the sound signal, the sound data pre-processor includes the time axis analyzer and the frequency axis analyzer. There is a case where in the signal processing for extracting the feature quantities, use of the analog sound signal rather than the digital sound data signal is preferable for efficient signal processing. In this case, the sound data pre-processor is located preceding at the prestage of the A/D converter, and extracts the physical feature quantities from the analog sound signal.

Figure 11:
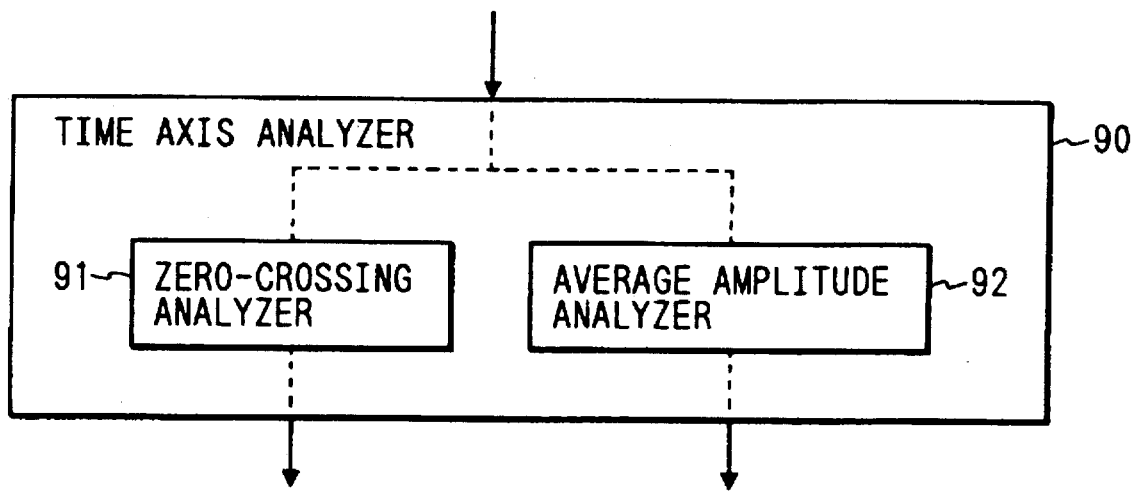
FIG. 11 is a block diagram showing a time axis analyzer of a sound signal analyzer in a modification of the sound data pre-processor.

Accordingly, the arrangements of the time axis analyzer and the frequency axis analyzer for extracting the physical feature quantities from the analog sound signal, which are employed in this instance, are implemented by analog signal processing circuits. In a case where the number of zero-crossings and the amplitude average value (moving average value) are used for the physical feature quantities of the sound signal, as shown in FIG. 11, a zero-crossing analyzer 91 and an average amplitude analyzer 92, which are constructed with analog signal processing circuits, exclusively used for those analyzers, are contained in a time axis analyzer 90. The analog data signals, which represent the physical feature quantities of the number of zero-crossings and the amplitude average value, are converted into digital sound data, by the A/D converter. Afterwards, the index data indicative of the feature quantities are prepared using the digital sound data.

Figure 12:
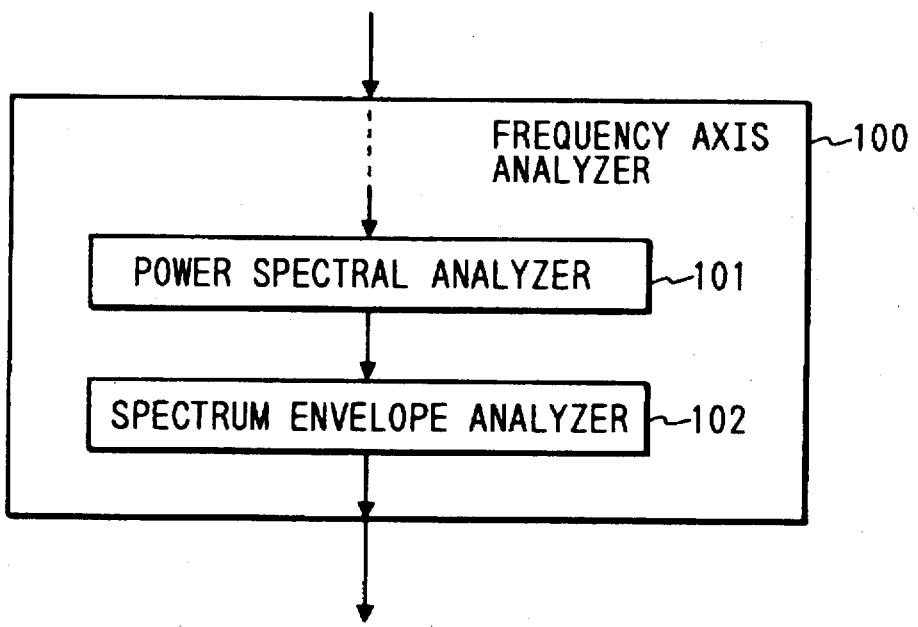
FIG. 12 is a block diagram showing a frequency axis analyzer of the sound signal analyzer in the modified sound data pre-processor.

In a case where the power amplitude of a sound signal in its frequency domain is used for the physical feature quantity of the sound signal, a frequency axis analyzer is arranged as shown in FIG. 12. In the figure, a frequency axis analyzer 100 includes a power spectral analyzer 101 and a spectrum envelope analyzer 102, which are constructed with analog signal processing circuits, exclusively used for those analyzers. An analog signal representing the physical feature quantity of a spectrum envelope parameter, is output from the frequency axis analyzer 100, and converted into digital data by the A/D converter. The index data indicative of the feature quantity is prepared using the digital sound data.

Figure 13:
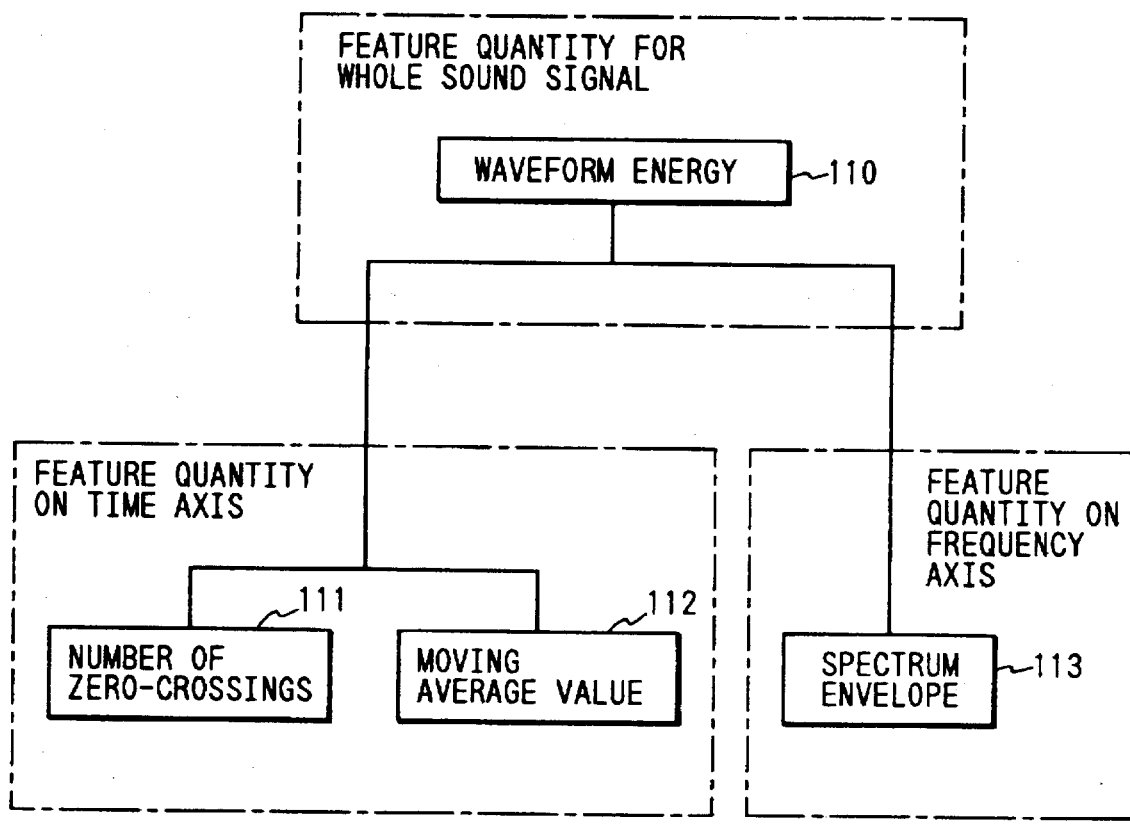
FIG. 13 is a diagram for explaining a relationship among quantities of different types of physical features of a sound signal.
Figure 14:
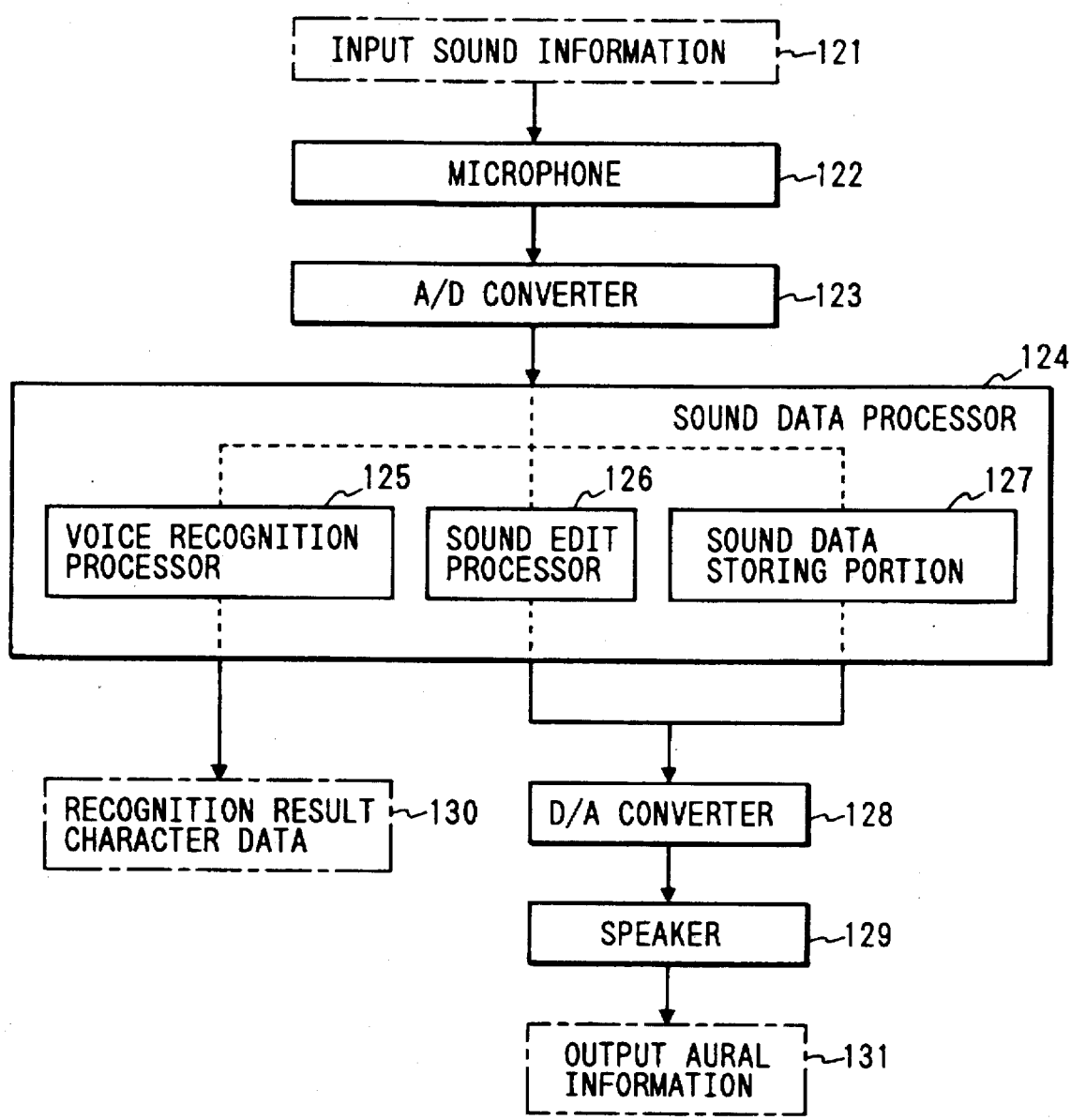
FIG. 14 is a block diagram showing the arrangement of a conventional sound processing system and signal flows in the arrangement.

Next, the physical feature quantities of a sound signal that can be used for preparing the index data indicative of the feature quantities, will be described. FIG. 13 is a diagram for explaining the relationship of different types of physical feature quantities of a sound signal. A parameter of waveform energy 110 may be used for the feature quantity of the whole sound signal, as shown in FIG. 13. A parameter of the number of zero-crossings 111 and a parameter of the moving average value 112 of the amplitudes of the sound signal waveform may be used for the feature quantities on the time axis. A parameter of the spectrum envelope 113 may be used for the feature quantity on the frequency axis of the sound signal waveform.

The magnitude of the parameter of the waveform energy 110 for each unit interval, which is used for the feature quantity of the whole sound signal, may be used for the feature quantity for discriminating the sound segment or the no sound segment of the sound signal. A fixed amount of waveform energy continues for the vowel segment of the voice portion. Accordingly, it can be used for the feature quantity for discriminating the vowel segment or the consonant segment in the voice portion of the sound signal.

The parameter of the number of zero-crossings 111 of the sound signal waveform is extracted as the feature quantity on the time axis of the sound signal. The number of zero-crossings of the waveform for each unit time indicates the frequency of the sound signal. Accordingly, it can also be used as the parameter indicating the center value of the frequency, and as the feature quantity indicative of the sound segment or the no sound segment. Further, they may be used as the feature quantity for discriminating speakers. The moving average value of the sound signal waveform as another feature quantity on the time axis indicates the average value of the amplitudes of the sound signal for a unit time. Accordingly, it can be used as the feature quantity for discriminatively indicating the sound segment and the no sound segment, and further speakers.

The parameter of the spectrum envelope 113 extracted as the feature quantity on the frequency axis of the sound signal may be used as the feature quantity indicating the amplitude of the power of the waveform for each unit time in the frequency domain. This parameter may be used for the feature quantity for discriminating the vowel segment and the consonant segment in the voice portion of the sound signal, and further for the feature quantity for discriminatively indicating the voice portion and the music portion.

As described above, in the sound processing system of the invention, the index data indicative of the feature quantities of a sound signal are assigned to the digital sound data of the sound signal. The digital sound data with the index data can be efficiently processed using the index data. In the voice recognition process, the segmental data of no sound in the digital sound data is selectively picked up using the index data, and removed from the digital sound data. The digital sound data except the data segments of no sound is processed for voice recognition. In this case, the digital sound data between one segment of no sound and the subsequent segment of no sound is handled as one logical block. Also in the sound edit process, the digital sound data (sound segment) between one segment of no sound and the subsequent segment of no sound is picked up as one logic block with the aid of the index data indicative of the segment of no sound, that is attached to the digital sound data. One or more logical blocks may be combined to form new digital sound data.

Thus, the feature quantity indicating the meaning contained in a sound signal is added to the digital sound data while not converted into character data. Therefore, it can be handled in the state of the sound signal. This fact makes it easy to use the sound information later, and leads to the lightening of the load for the voice recognition process and the reduction of the memory capacity of the memory required for storing the digital sound data.

In the sound processing system, the brief meaning of the sound data that are expressed by the feature quantities of the sound signal are attached, as they are or without being converted into character data, to the digital sound data. Therefore, the sound processing system grasps the meanings of the digital sound data to be processed before it enters the sound processing. As a result, the efficiency of the sound data processing is considerably improved.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A sound processing system using sound feature data comprising:

sound data storing means for storing a sound signal in the form of digital sound data;

analyzing means for analyzing the digital sound data of the input sound signal by segments of the digital sound data to obtain sound feature data related to a physical feature quantity of the sound signal;

discriminating means for discriminating an attribute of the physical feature quantity of the sound signal by segments of the digital sound data referring to a criterion according to which at least some of the sound feature data of the segments are significant and generating index data showing the attribute discriminated;

index data storing means for storing said index data showing the attribute discriminated for at least significant sound feature data in association with the digital sound data; and data processing means for further processing the digital sound data to produce a modified intelligible signal, including
  means for reading out from said index data storing means index data showing the attribute discriminated for the significant sound feature data, together with the associated digital sound data; and
  means for utilizing at least the digital sound data the segments having significant sound feature data.

2. The sound processing system according to claim 1, wherein said discriminating means produces the index data of the feature quantity of the sound signal for every segment of the digital sound data.

3. The system of claim 1 wherein the attribute discriminated indicates presence or absence of sound, and the data processing means further processes the digital sound data for which the presence of sound is indicated in accordance with the index data.

4. A sound processing system using sound feature data comprising:

input means for inputting a sound signal;

digitizing means for converting the input sound signal into digital sound data;

sound data storing means for storing the digital sound data;

pre-processing means for extracting a feature quantity of the sound signal from the digital sound data and assigning index data for the feature quantity of the sound signal to the digital sound data; including analyzing means for analyzing the digital sound data of the input sound signal by segments of the digital sound data to obtain sound feature data related to the feature quantity of the sound signal; and discriminating means for discriminating an attribute of the feature quantity of the sound signal by segments of the digital sound data referring to a criterion according to which at least some of the sound feature data of the segments are significant and generating the assigned index data as index data showing the attribute discriminated;

index data storing means for storing the generated index data in association with at least segments of the digital sound data having significant sound feature data; and processing means for further processing the digital sound data to produce a modified intelligible signal, including means for applying at least the segments of the digital sound data having significant sound feature data by reference to the generated index data showing the attribute discriminated.

5. A sound processing system using sound feature data comprising:

input means for inputting a sound signal;

digitizing means for converting the input sound signal into digital sound data;

pre-processing means for extracting a feature quantity of the sound signal from the digital sound data and attaching index data of the feature quantity of the sound signal to the digital sound data; including analyzing means for analyzing the digital sound data of the input sound signal, thereby obtaining a physical feature quantity of the sound signal; and discriminating means for discriminating an attribute of the physical feature quantity of the sound signal by segments of the digital sound data referring to a criterion according to which at least some of the sound feature data of the segments are significant and generating the attached index data showing the attribute discriminated; and processing means for further processing the digital sound data in accordance with the index data attached to the digital sound data, including means for applying at least the segments of the digital sound data having significant sound feature data by reference to the attached index data showing the attribute discriminated, to produce an intelligible output.

6. A sound processing system using sound feature data comprising:

an analog analyzer that analyzes the magnitude of the waveform energy of an input sound signal for each segment of the sound signal and produces consecutive sound feature quantities for the sound signal;

discriminating means for discriminating an attribute of each sound feature quantity of the sound signal by segments of the sound signal referring to a criterion according to which at least some of the sound feature quantities of the segments are significant and generating index data showing the attribute discriminated for each corresponding segment;

index data storing means for storing the generated index data in association with at least segments of the sound signal having significant sound feature quantities: and processing means for further processing the sound signal to produce a modified intelligible signal, including means for applying at least the segments of the sound signal having significant sound feature quantities by reference to the generated index data showing the attribute discriminated.

7. A sound processing system using sound feature data comprising:

an analog analyzer that analyzes the number of zero-crossings of waveform energy for each segment of a received sound signal, to produce a sound feature quantity of the sound signal;

discriminating means for discriminating an attribute of each sound feature quantity of the sound signal by segments of the sound signal referring to a criterion according to which at least some of the sound feature quantities of the segments are significant and generating index data showing the attribute discriminated for each corresponding segment;

index data storing means for storing the generated index data in association with at least segments of the sound signal having significant sound feature quantities: and processing means for further processing the sound signal to produce a modified intelligible signal, including means for applying at least the segments of the sound signal having significant sound feature quantities by reference to the generated index data showing the attribute discriminated.

8. A sound processing system using sound feature data comprising:

a frequency-domain analyzer that analyzes the magnitude of power of a received sound signal in the frequency domain for each segment of the sound signal, to produce a sound feature quantity of the sound signal segment;

discriminating means for discriminating an attribute of each sound feature quantity of the sound signal by segments of the sound signal referring to a criterion according to which at least some of the sound feature quantities of the segments are significant and generating index data showing the attribute discriminated for each corresponding segment;

index data storing means for storing the generated index data in association with at least segments of the sound signal having significant sound feature quantities: and processing means for further processing the sound signal to produce a modified intelligible signal, including means for applying at least the segments of the sound signal having significant sound feature quantities by reference to the generated index data showing the attribute discriminated.

9. A sound processing system using sound feature data comprising:

an analog analyzer that analyzes the average value of the magnitudes of a received sound signal, thereby producing a physical feature quantity of the sound signal;

discriminating means for discriminating an attribute of each sound feature quantity of the sound signal by segments of the sound signal referring to a criterion according to which at least some of the sound feature quantities of the segments are significant and generating index data showing the attribute discriminated for each corresponding segment;

index data storing means for storing the generated index data in association with at least segments of the sound signal having significant sound feature quantities: and processing means for further processing the sound signal to produce a modified intelligible signal, including means for applying at least the segments of the sound signal having significant sound feature quantities by reference to the generated index data showing the attribute discriminated.

10. A sound processing system comprising:

input means for inputting a sound signal;

digitizing means for converting the input sound signal into digital sound data;

at least first and second analyzing means for extracting feature quantities of the sound signal;

at least one discriminating means for discriminating significant and insignificant segments of each feature quantity extracted by said analyzing means, and for transferring only signal data of the significant segments to the subsequent analyzing means;

means for associating index data corresponding to the significant and insignificant segments with respective portions of the digital sound data; and processing means for further processing the digital sound data in accordance with the associated index data to produce an intelligible analog output.

11. The sound processing system according to claim 10, wherein said discriminating means discriminates the significant segment and the insignificant segment of the feature quantity in a manner that the feature quantity of each segment of the sound signal is compared with a predetermined value.

12. The sound processing system according to claim 10, wherein said analyzing means extracts the feature quantity of the sound signal during every predetermined unit time interval of the sound signal.

13. The sound processing system according to claim 10, wherein said analyzing means analyzes the magnitude of waveform energy for every time unit, thereby producing the physical feature quantity of the sound signal.

14. The sound processing system according to claim 10, wherein said analyzing means analyzes the number of zero-crossings of waveform for each time unit, thereby producing the physical feature quantity of the sound signal.

15. The sound processing system according to claim 10, wherein the first said analyzing means analyzes the number of zero-crossings of waveform for each time unit, thereby producing a first physical feature quantity of the sound signal, and the second said analyzing means analyzes the autocorrelation function of the sound signal waveform using the first feature quantity extracted by said first analyzing means, thereby producing a second feature quantity of the sound signal.

16. A sound processing system comprising:

input means for inputting a sound signal digitizing means for converting the input sound signal into digital sound data;

a plurality of analyzing means for successively extracting feature quantities of a sound signal;

a plurality of discriminating means for discriminating significant and insignificant segments of each feature quantity extracted by said analyzing means, and for transferring only signal data of the significant segments to the subsequent analyzing means;

means for associating index data corresponding to the significant and insignificant segments with respective portions of the digital sound data; and processing means for processing the digital sound data in accordance with the associated index data.

17. The sound processing system according to claim 16, wherein each of said discriminating means discriminates the significant segment and the insignificant segment of the feature quantity in a manner that the feature quantity of each segment of the sound signal is compared with a predetermined value.

18. The sound processing system according to claim 16, wherein each of said analyzing means extracts the feature quantity of the sound signal during every predetermined unit time interval of the sound signal.

19. The sound processing system according to claim 16, wherein each of said analyzing means analyzes the magnitude of waveform energy for every time unit, thereby producing the physical feature quantity of the sound signal.

20. The sound processing system according to claim 16, wherein each of said analyzing means analyzes the number of zero-crossings of waveform for each time unit, thereby producing the physical feature quantity of the sound signal.

21. The sound processing system according to claim 16, wherein a first one of said plurality of analyzing means analyzes the number of zero-crossings of waveform for each time unit, thereby producing a first physical feature quantity of the sound signal, and a second one of said plurality of analyzing means analyzes the autocorrelation function of the sound signal waveform using the first feature quantity extracted by said first stage of said analyzing means, thereby producing a second feature quantity of the sound signal.

* * * * *

UNITED STATES PATENT AND TRADEMARK OFFICE
CERTIFICATE OF CORRECTION

PATENT NO. : 5,675,709
DATED : October 07, 1997
INVENTOR(S) : Takeshi CHIBA

It is certified that error appears in the above-indentified patent and that said Letters Patent is hereby corrected as shown below:

Claim 1, column 16, line 34, before "index data", insert --the stored--.

Claim 1, column 16, line 37, after "sound data", insert --in--.

Claim 8, column 18, line 35, "quantities:", should read --quantities;--.

Claim 9, column 18, line 57, "quantities:", should read --quantities;--.

UNITED STATES PATENT AND TRADEMARK OFFICE
CERTIFICATE OF CORRECTION

PATENT NO. : 5,675,709
DATED : October 07, 1997
INVENTOR(S) : Takeshi CHIBA

It is certified that error appears in the above-identified patent and that said Letters Patent is hereby corrected as shown below:

Claim 16, column 19, line 42, after "sound signal", insert a line break.

Signed and Sealed this

Second Day of June, 1998

BRUCE LEHMAN

Attest:

Attesting Officer

Commissioner of Patents and Trademarks